Dec. 6, 1955   G. S. PORTER ET AL   2,725,958
BUMPER BLOCK
Filed March 16, 1953

INVENTORS:
George S. Porter.
BY William W. Wyatt.
Thomas R. Sweet.
Attorney.

United States Patent Office 2,725,958
Patented Dec. 6, 1955

2,725,958

BUMPER BLOCK

George S. Porter and William W. Wyatt, Denver, Colo., assignors to Flexicore Co. of Colorado, Denver, Colo., a corporation of Colorado Application March 16, 1953, Serial No. 342,327

4 Claims. (Cl. 188—32)

This invention relates to preformed, rigid units of suitable material, such as masonry, adapted for convenient, removable, replaceable, and shiftable installation against and to upstand from the ground surface of various locations, such as parking lots, loading docks, and the like, to function as bumper blocks limitative of vehicle travel directed thereagainst, and has as an object to provide an improved form and construction of such bumper blocks.

A further object of the invention is to provide an improved preformed, removable, replaceable, and shiftable bumper block characterized by positive vehicle-arresting properties available with a minimum of shock or damage to the vehicle restrained thereby.

A further object of the invention is to provide an improved preformed bumper block susceptible of operative installation in a desired position of use with a minimum of labor and expense.

A further object of the invention is to provide an improved and preformed bumper block adapted for expedient removal from an installed position of use with a minimum of effort and expense and without occasion for reworking of the area previously occupied thereby.

A further object of the invention is to provide an improved and preformed bumper block particularly adapted for prefabrication from readily-available materials with facility and economy.

A further object of the invention is to provide an improved and preformed bumper block particularly adapted for prefabrication and storage in quantity in anticipation of use, for expedient transportation to and installation in a desired position of use, and for repetitious use in any desired succession of particular installations.

With the foregoing and other objects in view, our invention consists in the construction, arrangement, and combination of elements as hereinafter set forth, pointed out in our claims, and illustrated by the accompanying drawing, in which—

Figure 1:
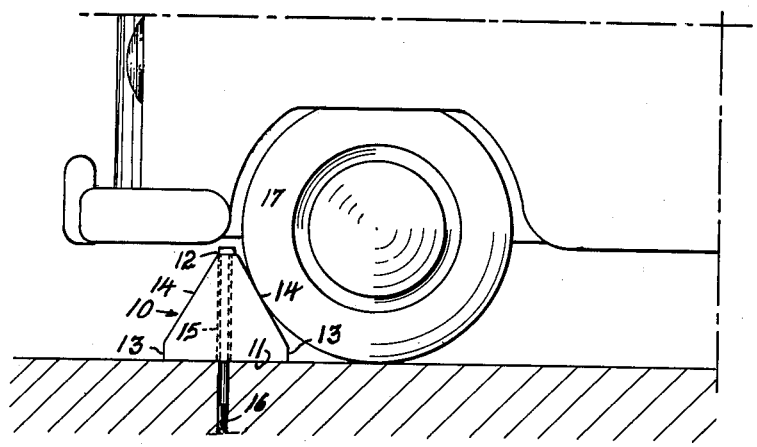
Figure 1 is an end elevation of a typical embodiment of the invention as installed and engaged by a vehicle in position of use, the ground zone represented in the view being shown in section, certain concealed elements of the invention being shown in broken lines, and only that portion of the vehicle immediately adjacent the improvement being illustrated.
Figure 2:
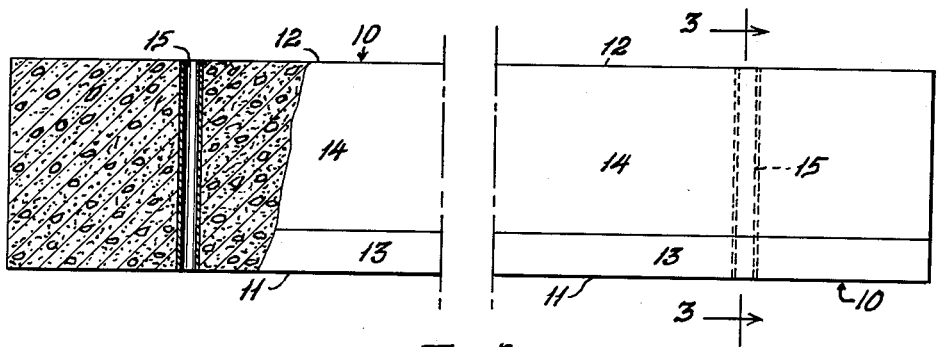
Figure 2 is a side elevation, on a relatively enlarged scale, of the embodiment of the invention shown in Figure 1, one end portion of the view being in vertical section and a central portion of the view being broken away to conserve space.

In many environments characterized by the use of wheeled, automotive vehicles it is expedient and practical to establish limits determinative of vehicle travel in a direction along a given path. Such limitation of vehicle travel is particularly consequential for the stalls of parking lots and areas, for the delineation of traffic areas with respect to adjacent lawns, shrubbery, and buildings, and for the protective positioning of vehicles relative to loading docks and analogous facilities. Curbs, elevated ribs, guard rails, and the like, have hitherto been extensively used for the limitation of vehicle travel in a wide range of particular installations, and many such conventional expedients have been less than satisfactory because of the expense of their relatively permanent installation, because of their inadaptability to removal, replacement, and shift, and because of the shock thereby imposed upon and the damage thereby caused to vehicles abruptly checked thereby, hence the instant invention is directed to the provision of a novel and improved preformed bumper block susceptible of construction and use to obviate the noted shortcomings of functionally-analogous previous arrangements.

The improved bumper block of the instant invention is simply and essentially a straight, elongated, rigid beam, preferably of reinforced concrete, characterized by considerable mass and conditioned at the time of its production to be pegged or spiked to the ground in a desired position of use, that which distinguishes the improvement being the particular form, proportions, and construction of the beam.

As illustrated, the improved bumper block is a preformed, rigid beam unit 10 of an appropriate length exceeding the tread gauge of the vehicle which it is designed to arrest. The beam 10 is preferably and expediently cast from concrete charged within suitable molds, and is characterized by a plane, rectangular, base area 11 of considerable width and an altitude, or beam depth, perpendicular to said base area somewhat less than the base area width.

The beam 10 is symmetrical with respect to its longitudinal plane perpendicular to and bisecting the base area 11 and is conformed to present a flat fillet 12 longitudinally and centrally of the beam in spaced parallel relation with the base 11 and hence determinative of beam altitude, or depth, relatively narrow, flat side margins 13 upstanding in spaced, parallel relation from the longitudinal side margins of and perpendicular to the base area 11, and flat arresting surfaces 14 inclined in an upward convergence from upper edges of the side margins 13 to the adjacent edges of the fillet 12. Conformed as shown and described, the beam 10 presents, in end elevation, an isosceles triangle whereof the vertices have been modified to provide the fillet 12 and side margins 13, thereby eliminating from the beam unit all thin-section zones and projections which might tend to chip and fracture in use and handling of the unit.

Conditioning the beam 10 for secure positioning in its ultimate position of use, like, straight, metallic tubes 15, of appropriate bore size and of a length corresponding with the depth of the associated beam, are incorporated in and to extend in the beam central vertical plane from the base area 11 and to the fillet 12 at the time the beam is cast in its mold; it being entirely feasible to position the tubes 15 within the mold preliminary to casting of the beam therein. The precise location and number of the tubes 15 comprised in a given beam 10 may conceivably vary somewhat with variation in the overall length of the beam, but in any particular beam unit at least two of said tubes will be utilized for security of beam installation and said tubes will preferably be disposed inwardly adjacent the respective ends of the beam and desirably in a separation longitudinally of the beam approximating the tread dimension of the vehicle which the beam is designed to arrest.

The tubes 15 being associated with the beam 10 to open through the beam depth in perpendicular relation to the beam base area 11, said tubes provide passages perpendicular to the ground surface engaged by the beam base area wherethrough may be driven headed spikes 16 of a diameter freely reciprocable within the tubes and of a length desirably some three times the beam depth, thus to provide a penetration of the spikes 16 within the ground zone underlying the beam adequate to securely anchor the beam in its position of installation when said spikes are driven to engagement of their heads against upper ends of the tubes 15.

Preformed in desired quantity in a maximum depth, or altitude, less than the minimum clearance of the vehicle engageable therewith, the beams 10 are available for transportation to the area of their use and for installation by means of the driven spikes 16 in any desired particularity of location and arrangement. Installed as shown and described transversely of the vehicle path thereby limited, each of the beams 10 constitutes an abutment characterized by a sloping face 14 opposed to the wheel treads of an approaching vehicle, so that, when a vehicle wheel 17 strikes the sloped abutment surface 14 the shock of the impact is minimized by a tendency of the wheel to roll up the inclined surface 14 and there is no sharp edge or angle featuring the bumper block against which the wheel tread may impinge with damaging effect. Further, by virtue of the sloped abutment surface 14 and the tendency of the wheel engaged therewith to roll on such surface, impact shocks imposed upon the bumper block are minimized with consequent diminution of tendencies acting to overturn the block about its ground-engaging corner remote from the wheel or to extract the spikes 16 from their ground penetration. Construction of the beam 10 with its complementary sloped surfaces 14 not only conditions the beam for use in either direction of side exposure but also results in a block of adequate mass, base area, and strength with conservation of block-forming materials.

Figure 3:
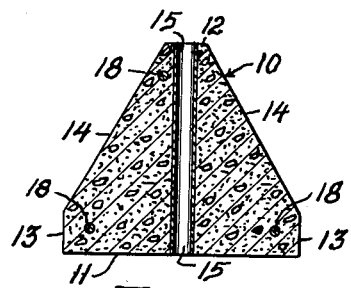
Figure 3 is a transverse section taken substantially on the indicated line 3—3 of Figure 2.

While it is within the contemplation of the invention that the beams 10 may be constituted from materials other than concrete, and that such beams may be developed from masonry and concrete masses without reinforcement other than the tubes 15, it is in accord with recognized good practice that said beams, when formed from concrete and analogous materials, should be reinforced, at least longitudinally, with a desirable minimum of three metallic rods 18 embedded within the beam mass and longitudinally thereof inwardly adjacent the edge corners of the beam, as is clearly shown in Figure 3.

Since changes, variations, and modifications in the form, construction, and arrangement of the elements shown and described may be had without departing from the spirit of our invention, we wish to be understood as being limited solely by the scope of the appended claims, rather than by any details of the illustrative showing and foregoing description.

We claim as our invention:

1. A bumper block of the character described comprising a straight, rigid, elongated, homogeneously-molded concrete beam formed with a plane, rectangular base area adapted for engagement against a ground surface, a flat, narrow, rectangular fillet formed longitudinally and centrally of said beam in spaced parallelism with said base area determinative of a beam depth less than the base area width, narrow, flat, side margins formed to upstand in spaced, parallel relation perpendicular to said base area at the long sides of the latter, flat arresting surfaces formed to bridge in upward convergence between adjacent edges of said side margins and fillet, and straight metallic tubes molded in and to traverse the depth of said beam between and perpendicular to said base area and fillet inwardly adjacent the beam ends.

2. A bumper block of the character described comprising a straight, rigid, elongated, homogeneously-molded concrete beam formed with a plane, rectangular base area adapted for engagement against a ground surface, a flat, narrow, rectangular fillet formed longitudinally and centrally of said beam in spaced parallelism with said base area determinative of a beam depth less than the base area, width, narrow, flat, side margins formed to upstand in spaced, parallel relation perpendicular to said base area at the long sides of the latter, flat arresting surfaces formed to bridge in upward convergence between adjacent edges of said side margins and fillet, and straight metallic tubes molded in and to traverse the depth of said beam between and perpendicular to said base area and fillet inwardly adjacent the beam ends; together with headed spikes through said tubes in penetrating engagement with the ground underlying the beam base area.

3. A bumper block of the character described comprising a straight, rigid, elongated, homogeneously-molded concrete beam formed with a plane, rectangular base area adapted for engagement against a ground surface, a flat, narrow, rectangular fillet formed longitudinally and centrally of said beam in spaced parallelism with said base area determinative of a beam depth less than the base area width, narrow, flat, side margins formed to upstand in spaced, parallel relation perpendicular to said base area at the long sides of the latter, flat arresting surfaces formed to bridge in upward convergence between adjacent edges of said side margins and fillet, metallic reinforcing rods embedded in and longitudinally of said beam inwardly adjacent the side margins and fillet thereof, and straight metallic tubes molded in and to traverse the depth of said beam between and perpendicular to said base area and fillet inwardly adjacent the beam ends.

4. A bumper block of the character described comprising a straight, rigid, elongated, homogeneously-molded concrete beam formed with a plane, rectangular base area adapted for engagement against a ground surface, a flat, narrow, rectangular fillet formed longitudinally and centrally of said beam in spaced parallelism with said base area determinative of a beam depth less than the base area width, narrow, flat, side margins formed to upstand in spaced, parallel relation perpendicular to said base area at the long sides of the latter, flat arresting surfaces formed to bridge in upward convergence between adjacent edges of said side margins and fillet, metallic reinforcing rods embedded in and longitudinally of said beam inwardly adjacent the side margins and fillet thereof, and straight metallic tubes molded in and to traverse the depth of said beam between and perpendicular to said base area and fillet inwardly adjacent the beam ends; together with headed spikes through said tubes in penetrating engagement with the ground underlying the beam base area.

References Cited in the file of this patent

UNITED STATES PATENTS

| | | |
|---|---|---|
| 936,854 | Beattie | Oct. 12, 1909 |
| 1,521,497 | Young | Dec. 30, 1924 |
| 1,694,316 | Evans | Dec. 4, 1928 |
| 1,922,462 | Tranchell | Aug. 15, 1933 |
| 2,522,104 | Edwards | Sept. 12, 1950 |
| 2,655,225 | Harris | Oct. 13, 1953 |

FOREIGN PATENTS

| | | |
|---|---|---|
| 481,831 | Canada | Mar. 18, 1952 |